US008625450B2

(12) United States Patent
Lunttila et al.

(10) Patent No.: US 8,625,450 B2
(45) Date of Patent: Jan. 7, 2014

(54) CHANNEL STATE INFORMATION FEEDBACK FOR ENHANCED DOWNLINK MULTIPLE INPUT—MULTIPLE OUTPUT OPERATION

(75) Inventors: Timo Lunttila, Espoo (FI); Tommi Koivisto, Espoo (FI); Timo Roman, Espoo (FI); Mihai Enescu, Espoo (FI)

(73) Assignee: Nokia Corporation, Espoo (FI)

( * ) Notice: Subject to any disclaimer, the term of this patent is extended or adjusted under 35 U.S.C. 154(b) by 332 days.

(21) Appl. No.: 13/080,347

(22) Filed: Apr. 5, 2011

(65) Prior Publication Data

US 2012/0082042 A1 Apr. 5, 2012

Related U.S. Application Data

(60) Provisional application No. 61/320,906, filed on Apr. 5, 2010.

(51) Int. Cl.
*H04L 12/26* (2006.01)
*H04W 4/00* (2009.01)
*G06F 11/00* (2006.01)

(52) U.S. Cl.
USPC ........... 370/252; 370/224; 370/328; 370/329; 370/437

(58) Field of Classification Search
USPC ......... 370/224, 241, 252, 328, 329, 295, 336, 370/437; 375/219, 296
See application file for complete search history.

(56) References Cited

U.S. PATENT DOCUMENTS

2010/0035555 A1* 2/2010 Bala et al. .................... 455/63.1
2010/0271968 A1* 10/2010 Liu et al. ...................... 370/252
2011/0268073 A1* 11/2011 Jian et al. ...................... 370/329
2011/0310994 A1* 12/2011 Ko et al. ....................... 375/295
2012/0051257 A1* 3/2012 Kim et al. ..................... 370/252

FOREIGN PATENT DOCUMENTS

EP 2117155 A1 11/2009
WO 2010147416 * 12/2010 ............... H04B 7/02
WO 2010147416 A2 12/2010

OTHER PUBLICATIONS

Ericsson, Nokia Siemens Networks, Huawei, Texas Instruments"CQI and PMI feedback on PUSCH for Multicodewords and Precoding", Jan. 14-18 (Feb. 12, 2008).*
International Search Report and Written Opinion, received in corresponding Patent Cooperation Treaty Application No. PCT/IB2011/051464. Dated Jun. 30, 2011. 15 pages.

(Continued)

*Primary Examiner* — Afsar M Qureshi
(74) *Attorney, Agent, or Firm* — Harrington & Smith

(57) ABSTRACT

In accordance with the exemplary embodiments of the invention there is deriving multiple input-multiple output feedback information using a set of precoding matrices associated with at least one precoding codebook, signaling, in a first plurality of resource elements, channel state information associated with a first precoding matrix indicator of the set of precoding matrices jointly with a transmission rank, and signaling separately, in a second plurality of resource elements, channel state information associated with a second precoding matrix indicator of the set of precoding matrices. In addition, there is receiving signaling in a first plurality of resource elements of channel state information associated with a first precoding matrix indicator of a set of precoding matrices jointly with a transmission rank, receiving signaling separately in a second plurality of resource elements of channel state information associated with a second precoding matrix indicator of the set of precoding matrices, and controlling a downlink multiple input-multiple output transmission in accordance with the received signaling.

22 Claims, 7 Drawing Sheets

(56) References Cited

OTHER PUBLICATIONS

Ericsson, Nokia, Nokia Siemens Networks, Huawei, texas Instruments: "CQI and PMI feedback on PUSCH for multi-codewords and precoding", TSG RAN WG1 meeting #51 bis, vol. R1-080527, Jan. 14-18 (Feb. 12, 2008. Sevilla, Spain; Section 1, section 2 lines 3-5, mode 1-2 and mode 3-2.

Ericsson: "PMI reporting: on the test configuration", TSG-RAN Working Group 4 (Radio) meeting #50bis, vol. R4-091283, Mar. 23-27, 2009, Seoul, South Korea: Figure 2 Section1.

Huawei, Freescale: "Way forward for MU-MIMO", 3GPP TSG RAN WG1 #49bis, vol. R1-073205, Jun. 25-29, 2007, Orlandao, FL, USA; Section 3 line 4.

Huawei: Downlink MIMO for E-UTRA, TSG-RAN Wg1 #43, vol. R1-051407, Nov. 7-11, 2005, Seoul, South Korea; Section 2.4.

"Way Forward for Rel-10 Feedback Framework", 3GPP RAN WG1 meeting #60, R1-101683, Mar. 2010, 2 pages.

"3rd Generation Partnership Project; Technical Specification Group Radio Access Network; Evolved Universal Terrestrial Radio Access (E-UTRA); Multiplexing and channel coding (Release 9)", 3GPP TS 36.212, v9.1.0, Mar. 2010, pp. 1-61.

"3rd Generation Partnership Project; Technical Specification Group Radio Access Network; Evolved Universal Terrestrial Radio Access (E-UTRA);Physical layer procedures (Release 9)", 3GPP TS 36.213, v9.1.0, Mar. 2010, pp. 1-79.

"3rd Generation Partnership Project; Technical Specification Group Radio Access Network; Evolved Universal Terrestrial Radio Access (E-UTRA); Physical Channels and Modulation (Release 9)", 3GPP TS 36.211, v9.1.0, Mar. 2010, pp. 1-85.

"3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)", 3GPP TS 36.300, v8.11.0, Dec. 2009, pp. 1-148.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3GPP TS 36.300, v9.1.0, Sep. 2009, pp. 1-165.

"3rd Generation Partnership Project; Technical Specification Group Radio Access Network; Requirements for further advancements for Evolved Universal Terrestrial Radio Access (E-UTRA) (LTE-Advanced) (Release 9)", 3GPP TR 36.913, v9.0.0, Dec. 2009, pp. 1-15.

* cited by examiner

FIG.3

| LTE Rel-8 | LTE Rel-10 |
|---|---|
| RI | PMI1 |
| PMI | PMI2 |
| CQI | CQI |

FIG.4

| SUBFRAME # | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Rel-8 | RI | | CQI(s)+PMI | | | | | CQI(s)+PMI | | | RI | | CQI(s)+PMI | | | | | CQI+PMI | | |
| Rel-10 | PMI1 | | CQI(s)+PMI2 | | | | | CQI(s)+PMI2 | | | PMI1 | | CQI(s)+PMI2 | | | | | CQI+PMI2 | | |

CHANNEL STATE INFORMATION FEEDBACK FOR ENHANCED DOWNLINK MULTIPLE INPUT—MULTIPLE OUTPUT OPERATION

CROSS-REFERENCE TO RELATED APPLICATIONS

This patent application claims priority under 35 U.S.C. §119(e) from Provisional Patent Application No. 61/320,906, filed Apr. 5, 2010, the disclosure of which is incorporated by reference herein in its entirety.

TECHNICAL FIELD

The exemplary and non-limiting embodiments of this invention relate generally to wireless communication systems, methods, devices and computer programs and, more specifically, relate to feedback signaling in support of downlink multiple input-multiple output operation between a network access node and a user equipment.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
BLER block error rate
BS base station
BW bandwidth
CB codebook
CoMP coordinated multi-point transmission/reception
CQI channel quality indicator
CRC cyclic redundancy check
CSI channel state information
CSI-RS channel state information reference symbols
DFT discrete Fourier transform
DL downlink (eNB towards UE)
eNB E-UTRAN Node B (evolved Node B)
EPC evolved packet core
E-UTRAN evolved UTRAN (LTE)
IMT-A international mobile telecommunications advanced
LTE long term evolution of UTRAN (E-UTRAN)
LTE-A LTE advanced
MAC medium access control (layer 2, L2)
MCS modulation and coding scheme
MIMO multiple input-multiple output
MM/MME mobility management/mobility management entity
MU-MIMO multi-user MIMO
NodeB base station
OFDMA orthogonal frequency division multiple access
OAM operations and maintenance
PDCCH physical downlink control channel
PDCP packet data convergence protocol
PHY physical (layer 1, L1)
PMI precoding matrix indicator
PRB physical resource block
PUCCH physical uplink control channel
PUSCH physical uplink shared channel
RB resource block
Rel release
RI rank indicator
RLC radio link control
RRC radio resource control
RRM radio resource management
RS reference symbols
SC-FDMA single carrier-frequency division multiple access
SGW serving gateway
SU-MIMO single-user MIMO
TBS transport block size
TX transmitter
UE user equipment, such as a mobile station, mobile node or mobile terminal
UL uplink (UE towards eNB)
UTRAN universal terrestrial radio access network One modern communication system is known as evolved UTRAN (E-UTRAN, also referred to as UTRAN-LTE or as E-UTRA). The DL access technique is OFDMA, and the UL access technique is SC-FDMA.

One specification of interest is 3GPP TS 36.300, V8.11.0 (2009-12), "3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8)," incorporated by reference herein in its entirety. This system may be referred to for convenience as LTE Rel-8. In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.1.0 (2009-9).

FIG. 1A reproduces Figure 4.1 of 3GPP TS 36.300 V8.11.0, and shows the overall architecture of the EUTRAN system (Rel-8). The E-UTRAN system includes eNBs, providing the E-UTRAN user plane (PDCP/RLC/MAC/PHY) and control plane (RRC) protocol terminations towards the UE (not shown). The eNBs are interconnected with each other by means of an X2 interface. The eNBs are also connected by means of an S1 interface to an EPC, more specifically to a MME by means of a S1 MME interface and to an S-GW by means of a S1 interface (MME/S-GW). The S1 interface supports a many-to-many relationship between MMEs/S-GWs and eNBs.

The eNB hosts the following functions:
functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or OAM); and
a measurement and measurement reporting configuration for mobility and scheduling.

Also of interest herein are the further releases of 3GPP LTE (e.g., LTE Rel-10) targeted towards future IMT-A systems, referred to herein for convenience also simply as LTE-Advanced (LTE-A). Reference in this regard may be made to 3GPP TR 36.913, V9.0.0 (2009-12), 3rd Generation Partnership Project; Technical Specification Group Radio Access Network; Requirements for Further Advancements for EUTRA (LTE-Advanced) (Release 9). A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for IMT-Advanced while keeping the backward compatibility with LTE Rel-8.

As is specified in 3GPP TR 36.913, LTE-A should operate in spectrum allocations of different sizes, including wider spectrum allocations than those of LTE Rel-8 (e.g., up to 100 MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation, where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

A terminal may simultaneously receive one or multiple component carriers depending on its capabilities. A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

FIG. 1B shows an example of the carrier aggregation, where M Rel-8 component carriers are combined together to form M times Rel-8 BW (e.g. 5*20 MHz=100 MHz given M=5). Rel-8 terminals receive/transmit on one component carrier, whereas LTE-A terminals may receive/transmit on multiple component carriers simultaneously to achieve higher (wider) bandwidths.

One discussion in 3GPP has focused on the design of an eight transmit antenna DL channel codebook. As can be appreciated, this has a direct impact on the feedback signaling required to support DL MIMO extensions in LTE Rel-10.

SUMMARY

In an exemplary aspect of the invention, there is a method comprising deriving multiple input-multiple output feedback information using a set of precoding matrices associated with at least one precoding codebook, signaling, in a first plurality of resource elements, channel state information associated with a first precoding matrix indicator of the set of precoding matrices jointly with a transmission rank, and signaling separately, in a second plurality of resource elements, channel state information associated with a second precoding matrix indicator of the set of precoding matrices.

In another exemplary aspect of the invention, there is an apparatus comprising at least one processor, and at least one memory including computer program code, where the at least one memory and the computer program code are configured, with the at least one processor, to cause the apparatus to at least: derive multiple input-multiple output feedback information using a set of precoding matrices associated with at least one precoding codebook, signal, in a first plurality of resource elements, channel state information associated with a first precoding matrix indicator of the set of precoding matrices jointly with a transmission rank, and signal separately, in a second plurality of resource elements, channel state information associated with a second precoding matrix indicator of the set of precoding matrices.

In another exemplary aspect of the invention, there is a method comprising receiving signaling in a first plurality of resource elements of channel state information associated with a first precoding matrix indicator of a set of precoding matrices jointly with a transmission rank, receiving signaling separately in a second plurality of resource elements of channel state information associated with a second precoding matrix indicator of the set of precoding matrices, and controlling a downlink multiple input-multiple output transmission in accordance with the received signaling.

In still another exemplary aspect of the invention, there is an apparatus comprising at least one processor, and at least one memory including computer program code, where the at least one memory and the computer program code are configured, with the at least one processor, to cause the apparatus to at least: receive signaling in a first plurality of resource elements of channel state information descriptive associated with a first precoding matrix indicator of a set of precoding matrices jointly with a transmission rank, receive signaling separately in a second plurality of resource elements of channel state information associated with a second precoding matrix indicator of the set of precoding matrices, and control a downlink multiple input-multiple output transmission in accordance with the received signaling.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 3 shows a mapping of channel state information signaling fields from LTE Rel-8 to LTE Rel-10 in accordance with an exemplary embodiment of this invention.

FIG. 4 illustrates as basic principle of CSI feedback reporting according to the exemplary embodiments of this invention.

DETAILED DESCRIPTION

Figure 1A:
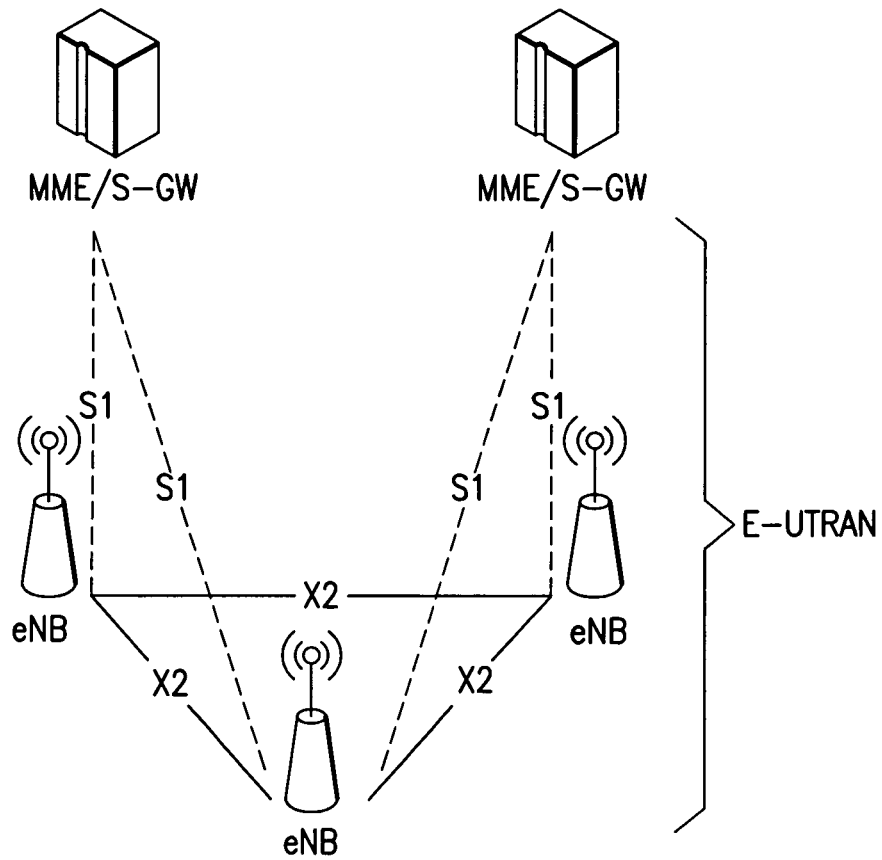
FIG. 1A reproduces Figure 4.1 of 3GPP TS 36.300, and shows the overall architecture of the EUTRAN system.
Figure 1B:
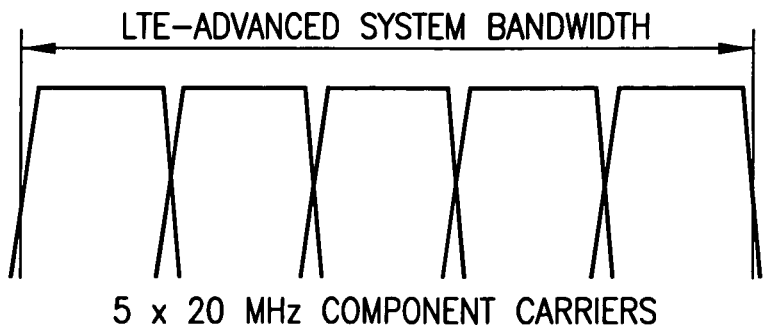
FIG. 1B shows an example of carrier aggregation as proposed for the LTE-A system.

The exemplary embodiments of this invention relate generally to mobile wireless communication, such as 3GPP LTE- A. The exemplary embodiments of this invention relate more specifically to design aspects of DL MIMO operation in LTE-A, taking into account the extension(s) needed to support eight Tx antenna ports as well as enhanced MU-MIMO, a work item of enhanced DL MIMO.

Taking as a basis a multi-granular CSI feedback approach, the exemplary embodiments focus on the design of UL control feedback signaling to support flexible, reliable and efficient DL single user (SU) and multi-user (MU) MIMO operation in LTE Rel-10, as well as in releases of LTE (releases beyond Rel-10).

During the standardization of LTE Rel-10 in 3GPP there has been interest expressed by network operators to further improve the competitiveness of LTE DL MIMO operation as compared to what has been specified in Rel-8 and Rel-9. More specifically, the following aspects have been proposed for further work:

support for eight transmit antenna ports and up to 8-layer DL MIMO operation;
support for enhanced DL MU-MIMO operation;
support for UE-specific reference symbols (RSs) for transmission rank ranging from 1 to 8;
support for periodic CSI-RS; and
support for CoMP.

An aspect of DL MIMO enhancement is the design of the precoding codebook and the corresponding feedback signaling provided to the eNB by the UE. Without accurate feedback those gains achievable from the use of advanced MIMO techniques would be diminished. Moreover DL MU-MIMO has received considerable interest. One important consideration is how to design efficient and unified UE 10 feedback in support of both DL SU-MIMO and MU-MIMO, which may be intrinsically tied together within the same DL transmission mode.

In LTE Rel-8 the CSI feedback has three distinct components:

CQI—which indicates the MCS/TBS the UE 10 can support without exceeding a given BLER target (10% BLER in Rel-8);
PMI—the preferred precoding matrix index from a codebook known to both the eNB and the UE; and
RI—the rank indicator, which is a UE suggestion to the eNB for the number of supported spatial layers/streams for DL transmission.

In the LTE Rel-8 precoding schemes the CQI and the PMI feedback are jointly encoded while the RI is encoded separately. This is due to the fact that the value of RI determines the payload of the remainder of the CSI.

Several feedback schemes have been proposed in 3GPP RAN1 for LTE Rel-10. Some of the proposals are unrealistic (in terms of associated UL feedback overhead) and/or infeasible (due to a lack of testability and from an actual deployment perspective).

Considering the needed support for 8-Tx closed loop (CL) MIMO, it can be shown that what is needed is the definition of a versatile feedback design that is able to cope with various scenarios and eNB antennas deployments (e.g., cross-polarized and uniform linear array (ULA) deployments), while providing a realistic balance between performance gains, UE complexity, testability, overall UL feedback and UL/DL signaling overhead.

An agreed way forward from the 3GPP RAN WG1 meeting #60 held in February 2010 defined a framework for the feedback and codebook design. For example, 3GPP contribution R1-101683 indicates that implicit feedback (PMI/RI/CQI) is used also for Rel-10, where the UE spatial feedback for a subband represents a precoder, and CQI is computed based on the assumption that the eNB uses a specific precoder (or precoders), as given by the feedback, on each subband within the CQI reference resource (note that a subband can correspond to the entire system bandwidth).

Contribution R1-101683 also indicated that a precoder for a subband is composed of two matrices. The precoder structure is applied to all Tx antenna array configurations. Further each of the two matrices belongs to a separate codebook (the codebooks themselves have been reserved for further study). These codebooks are known (or synchronized) at both the eNB and the UE, and the codebooks may or may not change/vary over time and/or over different subbands. That is, two codebook indices will together determine the precoder. One of the two matrices pertains to wideband and/or long-term channel properties, while the other matrix pertains to frequency-selective and/or short-term channel properties. A matrix codebook in this context can be interpreted as a finite enumerated set of matrices that for each RB is known to both the UE and to the eNB. The Rel-8 precoder feedback can be deemed as a special case of this structure.

An important aspect of this agreement on the way forward was that the precoder is being constructed from two precoding matrices. These can be denoted as PMI1 and PMI2 for convenience. Each of PMI1 and PMI2 refer to precoding matrix indices within respective codebooks, denoted by W1 and W2, respectively. The resulting precoder is determined by PMI1 and PMI2 jointly. At least one of the two precoding matrices targets wideband and/or long-term channel properties while the other precoding matrix may target frequency-selective and/or short-term channel properties. The resulting precoder for each frequency subband can be considered to be a combination (e.g., the product) of the wideband precoder selected from codebook W1 and the per subband precoder selected from codebook W2. This is a notable deviation from the codebook design principle in LTE Rel-8, where the precoder is composed of only one precoding matrix (denoted as PMI) belonging to a single codebook.

From the agreement reached during the 3GPP RAN WG1 meeting #60 it should be appreciated that the feedback structure is also in need of modification, i.e., an efficient technique to feed back both PMI1 and PMI2 needs to be defined.

Figure 2:
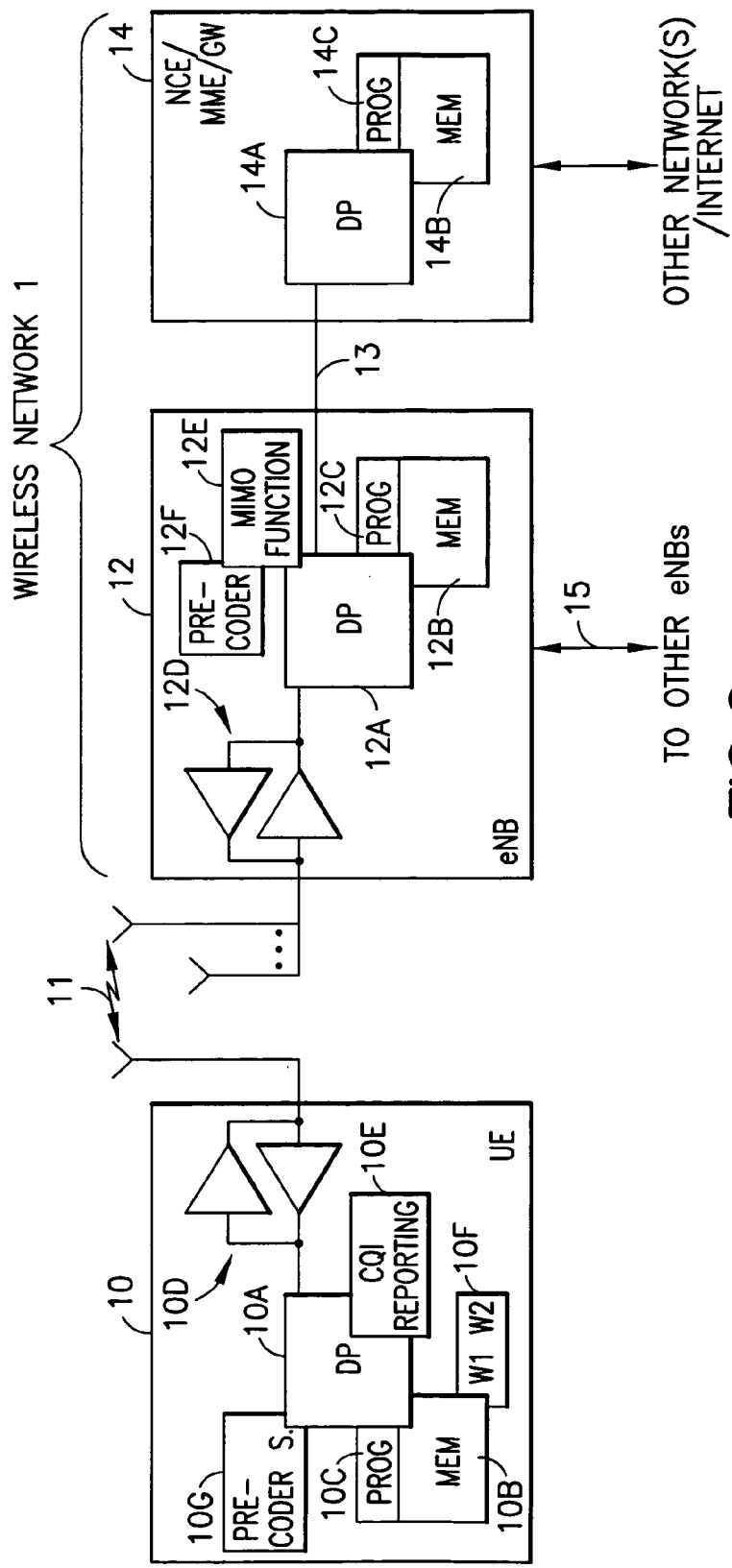
FIG. 2 shows a simplified block diagram of various electronic devices that are suitable for use in practicing the exemplary embodiments of this invention.

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to as a UE 10, via a network access node, such as a Node B (base station), and more specifically an eNB 12. The network 1 may include a network control element (NCE) 14 that may include the MME/SGW functionality shown in FIG. 1A, and which provides connectivity with a further network, such as a telephone network and/or a data communications network (e.g., the internet). The UE 10 includes a controller, such as a computer or a data processor (DP) 10A, a non-transitory computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas (typically several, such as up to eight, when multiple input/multiple output (MIMO) operation is in use). The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

For the purposes of describing the exemplary embodiments of this invention the UE 10 can be assumed to also include a MIMO-related CQI reporting unit or function 10E that composes feedback signaling to the eNB 12, as well as a plurality of precoding codebooks 10F (designed as W1 and W2) that are stored in the memory 10B. Each of precoding matrices PMI1 and PMI2 are associated with the separately defined precoding codebooks W1 and W2, respectively. At least one of the two precoding matrices pertains to wideband and/or long-term channel properties while the other precoding matrix may pertain to frequency-selective and/or short-term channel properties. The UE 10 also includes a precoder selector (Precoder S.) or estimator unit or function 10G. The eNB 12 can be assumed to include a MIMO unit or function 12E that interprets and responds to the feedback information output from the CQI reporting function 10E of the UE 10 for controlling and managing DL MIMO transmissions to the UE 10. As a part of this functionality the eNB 12 also includes a precoder 12F, and the precoding thus takes place in the eNB 12. In operation, the UE 10 estimates, based on DL reference symbols, the preferred precoding matrices PMI1 and PMI2 and send them as a feedback to the eNB 12. The eNB 12 does not need to obey the recommendation, and it can basically freely select the precoder.

The PROGs 10C and 12C are assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on multi-core processor architectures, as non-limiting examples.

Turning now to a detailed description of the exemplary embodiments of this invention, there is provided a design of a feedback signaling framework that supports flexible, reliable and efficient DL SU-MIMO and MU-MIMO operation in LTE Rel-10, as well as in further releases of LTE, without mandating a major redesign of the UL control signaling structures. The exemplary embodiments define a CSI feedback signaling framework for PMI1 and PMI2 that maximizes the UE 10 implementation synergy with LTE Rel-8. As a result of this synergy the standardization effort related to the LTE-A feedback signaling is reduced.

More specifically, the exemplary embodiments define the CSI signaling for the wideband precoding component (PMI1 from the codebook W1) so that there is no need to signal the transmission rank (RI) explicitly. In other words, the transmission rank is signaled jointly/implicitly with the wideband/long term channel characteristics described by PMI1. This approach allows a mapping of the Rel-8 (and Rel-9) feedback signaling fields to the Rel-10 feedback signaling fields as shown in FIG. 3.

The above described mapping makes it possible to reuse efficiently the signaling structures from LTE Rel-8, hence minimizing the need for changes in the standards or in the device and the network implementation. Exemplary implementation examples for the UL channels PUCCH and PUSCH are described below.

A prerequisite for the mapping is that the codebook structure of W1 and W2 allow for implicit/joint signaling of RI (i.e., the indication of RI is embedded in the signaling of PMI1). The generic structure of W1 enables the above mentioned mapping because it is expected to fulfill the following properties.

Assume that the codebook W1 contains elements for up to transmission rank M (typically M=2, 4, or 8). The codebook W1 contains multiple elements per transmission rank only for the N lowest ranks. The rank specific elements in the codebook W1 for rank R>N consist of fewer elements each than those of the N lowest ranks. One non-limiting assumption for the implementation of the exemplary embodiments of this invention is that the total number of codebook elements for all transmission ranks is low enough such that there is no need to signal the rank explicitly. In other words, RI may be signaled jointly with the precoder matrix indicator itself and, hence, just an indication of the precoding matrix index will suffice. This can be accomplished using, for example, about 4 bits to about 8 bits.

Discussed first is signaling using the PUCCH. As was made apparent above, the exemplary embodiments reuse the existing signaling by defining a re-mapping between the control signaling fields. In LTE Rel-8 the RI is sent in different subframes than CQI and PMI, which are jointly encoded. All the fields are transmitted using the PUCCH formats 2/2a/2b. Reference with regard to PUCCH formats 2/2a/2b can be made to 3GPP TS 36.211 V9.1.0 (2010-03) Technical Specification 3rd Generation Partnership Project; Technical Specification Group Radio Access Network; Evolved Universal Terrestrial Radio Access (E-UTRA); Physical Channels and Modulation (Release 9), Section 5.4.2, "PUCCH formats 2/2a/2b".

For completeness, it should be noted that alternatively block-spread DFT-S-OFDMA or multi-sequence modulation could be used. In such a case also tail-biting convolutional codes can be considered as the forward error correcting scheme. That is, the exemplary embodiments of this invention are not limited for use only with the existing PUCCH formats, and other techniques/formats can be used as well.

Based on the foregoing, the following principles can be defined for the transmission of PMI1 and PMI2:

A) PUCCH formats 2/2a/2b can be used (as a non-limiting example);

B) the parameters periodicity and subframe offset are configured separately for the reports that contain PMI1 or PMI2, similarly as for the RI and CQI/PMI in LTE Rel-8;

C) RI is not explicitly signaled;

D) PMI1 is sent in the place of RI, and the same (20, N) Walsh-Hadamard block coding is used for forward error correction as in LTE Rel-8 and, additionally, a corresponding CQI (or possibly two CQIs when rank>1) may be embedded into the report;

E) PMI2 is sent in the place of PMI., otherwise the structure of the report is exactly as is defined for LTE Rel-8; and F) the reporting modes defined in LTE Rel-8 with closed loop MIMO operation (mode 1-1 and 2-1 as defined in 3GPP TS 36.213 V9.1.0 (2010-03) Technical Specification 3rd Generation Partnership Project; Technical Specification Group Radio Access Network; Evolved Universal Terrestrial Radio Access (E-UTRA); Physical layer procedures (Release 9).

An exemplary diagram of the reporting assuming mode 1-1 is depicted in FIG. 4. Here the periodicity of the RI and CQI/PMI reporting is 10 subframes and 5 subframes, respectively. For simplicity the same periodicities are assumed for PMI1 and CQI/PMI2. In the RRC configuration parameters the same signaling fields can be used as in the case of Rel-8.

Discussed now is signaling using the PUSCH (periodic or aperiodic). The basic principle remains the same as in the case of the PUCCH, i.e., PMI1 replaces RI and PMI2 replaces PMI. In the case of PMI2 there are no issues with applying the Rel-8 channel coding principles directly. Furthermore, the Rel-8 aperiodic reporting formats for closed loop MIMO operation (Aperiodic modes 1-2, 2-2, and 3-1 as defined in 3GPP 36 TS 36.213) can be used as already specified. As an example, in the where case multiple PMIs are included in the report, such as in mode 1-2, each of the Rel-8 subband specific PMIs can be replaced with a corresponding PMI2 calculated assuming the same subband definitions as in Rel-8.

However, the channel coding used for RI in LTE Rel-8 is either simple repetition coding (in the case of a 1-bit RI) or duplex coding (with a 2-bit RI). Neither of these two Rel-8 schemes are applicable as such for PMI1 since the payload size is different (or at least they would be sub-optimal coding schemes if used for PMI2).

The use of the (32, N) Walsh-Hadamard block coding (used in LTE-Rel-8 when periodic CQI is transmitted on the PUSCH together with data) is one type of coding that can be used for PMI1. Alternatively the (20, N) Walsh-Hadamard block coding used on the PUCCH is another type of coding that can be used for PMI1. The exemplary embodiments of this invention are not, however, limited for use with only (32, N) Walsh-Hadamard block coding or (20, N) Walsh-Hadamard block coding.

Figure 5:
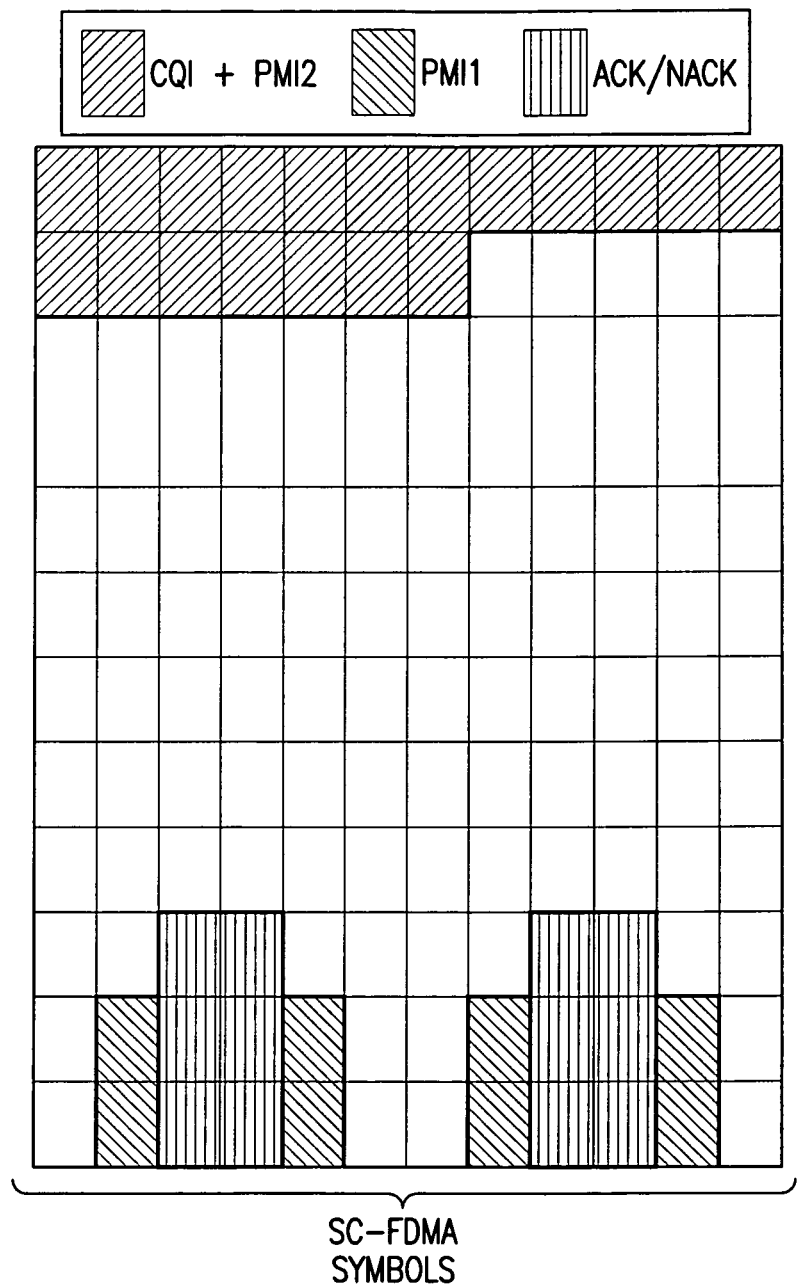
FIG. 5 shows an example of PMI1 being placed on the resources used for RI in LTE Rel-8, in accordance with one exemplary embodiment, and where PMI2/CQI is placed on the resource used for PMI/CQI in Rel-8.
Figure 6:
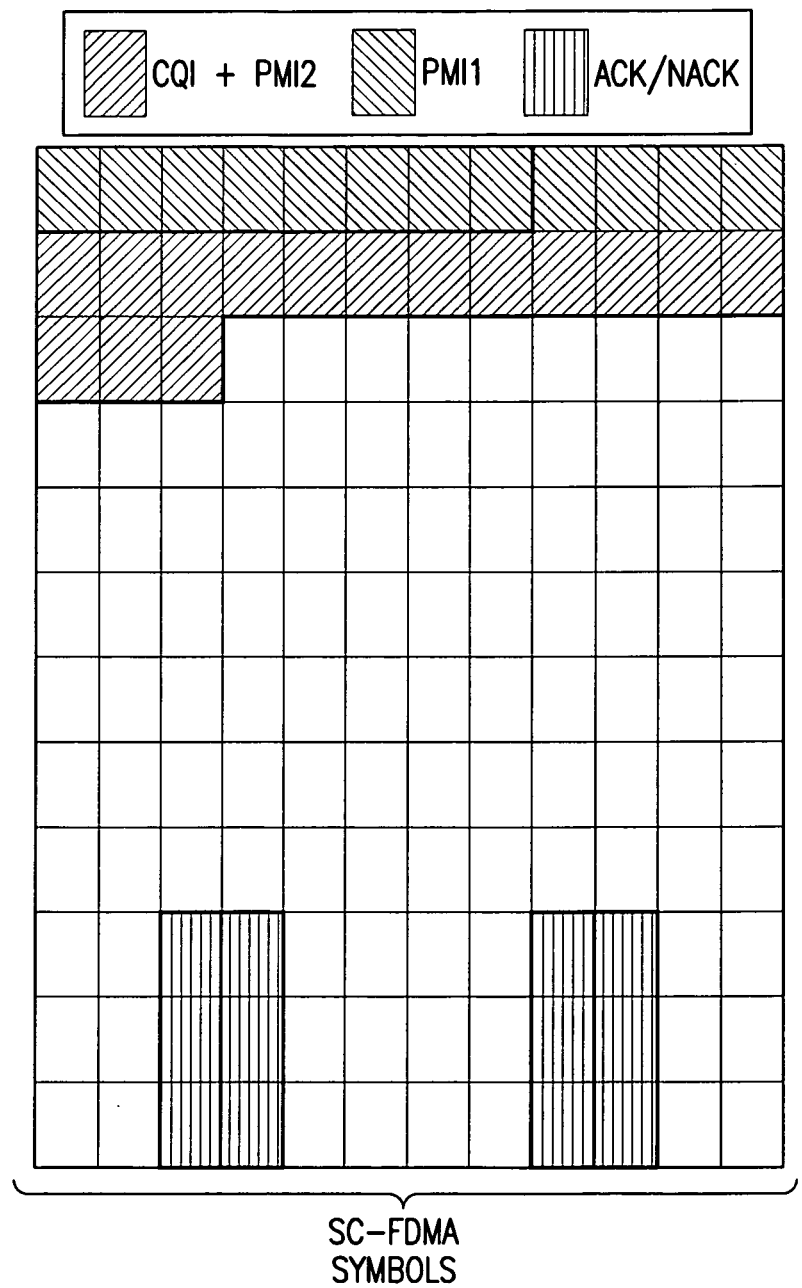
FIG. 6 shows resources for PMI1 that are reserved from the location used for CQI/PMI in LTE Rel-8, and the resources for PMI2 follow these resources in accordance with another exemplary embodiment.

The number of resource elements for PMI1 can be derived using the formulas defining UL control signals dimensioning in LTE Rel-8. Reference in this regard may be made to 3GPP TS 36.212 V9.1.0 (2010-03) Technical Specification 3rd Generation Partnership Project; Technical Specification Group Radio Access Network; Evolved Universal Terrestrial Radio Access (E-UTRA); Multiplexing and channel coding (Release 9), such as Section 5.2.2.6, Channel coding of control information There are several alternatives/options for allocating the resource element (RE) positions for signaling the PMI1. One option is to use the same resources as for the RI in LTE Rel-8 as shown in FIG. 5. However, in this approach the maximum number of REs may not be sufficient in all cases to guarantee sufficient reliability for signaling. Another option is to allocate a new set of resources for PMI1 as is shown in FIG. 6. One advantageous technique to accomplish this is to reserve the resources from the same positions as used for carrying CQI/PMI in Rel-8. In such a case the resources for PMI2/CQI can be placed following the resources for PMI1. The resources for PMI2/CQI are then followed by the resource for user data.

Note that in this exemplary embodiment the subframe for signaling PMI1 and the subframe for signaling PMI2 do not need to be in the same frame. Further, they may also be signaled in the same subframe. This is also the case for joint signaling an RI and PMI. Any of the RIs or PMIs may be jointly signaled in the same frame or a separate frame from another RI and/or PMI.

Discussed now is the codebook design. One desirable codebook structure for W1 is that the number of codebook elements for the lowest ranks (e.g., ranks 2 or 4 and below) is significantly higher than that of higher ranks (e.g., above 4). This is compatible with the fact that in many generic codebook designs the lower ranks are given the most emphasis since they generally provide most precoding gain. This assumption holds for the dual codebook structure as well, i.e., the wideband precoding component (PMI1 from the W1 codebook) can be expected to yield the highest gains for transmission ranks lower than two or four, in many practical use case scenarios.

The use of the exemplary embodiments of this invention provides a number of technical effects. For example, the use of the exemplary embodiments provides a way to feedback PMI1 and PMI2 utilizing the UL control signaling principles defined for LTE Rel-8. The use of the exemplary embodiments thus minimizes the standardization effort required to implement the LTE-Rel-10 CSI MIMO feedback. The use of the exemplary embodiments of this invention also simplifies the implementation by allowing a large reuse of existing baseband functionalities. Further, as it is well understood that the lowest ranks have the highest importance (e.g., with respect to precoding gain) there can be the highest number of codebook elements at low ranks, thereby making the joint signaling of RI and PMI1 practical.

Based on the foregoing it should be apparent that the exemplary embodiments of this invention provide a method, apparatus and computer program(s) to provide enhanced CSI feedback for DL MIMO operation in LTE Rel-10 and beyond Rel-10.

Figure 7:
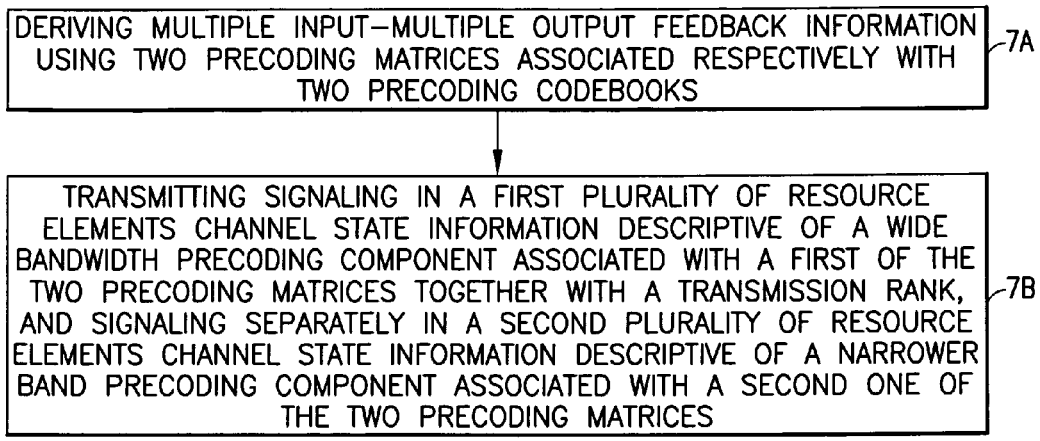
FIGS. 7, 8, 9, and 10 are logic flow diagrams that illustrate the operation of a method, and a result of execution of computer program instructions embodied on a computer readable memory, in accordance with the exemplary embodiments of this invention.

FIG. 7 is a logic flow diagram that illustrates the operation of a method, and a result of execution of computer program instructions, in accordance with the exemplary embodiments of this invention. In accordance with these exemplary embodiments a method performs, at Block 7A, a step of deriving multiple input-multiple output feedback information using two precoding matrices associated respectively with two precoding codebooks. At Block 7B there is a step of transmitting signaling, in a first plurality of resource elements, of channel state information descriptive of a wide bandwidth precoding component associated with a first of the two precoding matrices together with a transmission rank, and signaling separately, in a second plurality of resource elements, channel state information descriptive of a narrower band precoding component associated with a second one of the two precoding matrices.

In the foregoing method, where the transmission rank is signaled implicitly by the wide bandwidth precoding component.

In the foregoing method, where the channel state information descriptive of the wide bandwidth precoding component and the transmission rank is signaled in a first subframe of a frame, and where the channel state information descriptive of the narrower band precoding component associated with the second one of the two precoding matrices is signaled in at least one subsequent subframe of the frame following the first subframe of the frame.

The method as in the preceding paragraph, where the signaling is transmitted using the physical uplink control channel.

The method as in the preceding paragraph, where the channel state information descriptive of the wide bandwidth precoding component and the transmission rank is forward error corrected using (20, N) Walsh-Hadamard block coding.

In the foregoing method, where the subframe for signaling PMI1 and the subframe for signaling PMI2 do not need to be in the same frame.

The method as in FIG. 7, where the signaling is transmitted periodically or aperiodically using the physical uplink shared channel, and where the channel state information descriptive of the wide bandwidth precoding component and the transmission rank is transmitted using at least one set of resource elements of a block of SC-FDMA symbols, where the at least one set of resource elements follow a set of resource elements used to transmit the channel state information descriptive of the narrower band precoding component associated with the second one of the two precoding matrices.

The method as in FIG. 7, where the signaling is transmitted periodically or aperiodically using the physical uplink shared channel, and where the channel state information descriptive of the wide bandwidth precoding component and the transmission rank is transmitted using at least one set of resource elements of a block of SC-FDMA symbols, where the at least one set of resource elements are transmitted before a set of resource elements used to transmit the channel state information descriptive of the narrower band precoding component associated with the second one of the two precoding matrices.

The method as in the preceding two paragraphs, where the channel state information descriptive of the wide bandwidth precoding component and the transmission rank is forward error corrected using (32, N) Walsh-Hadamard block coding, or by using (20, N) Walsh-Hadamard block coding.

Figure 8:
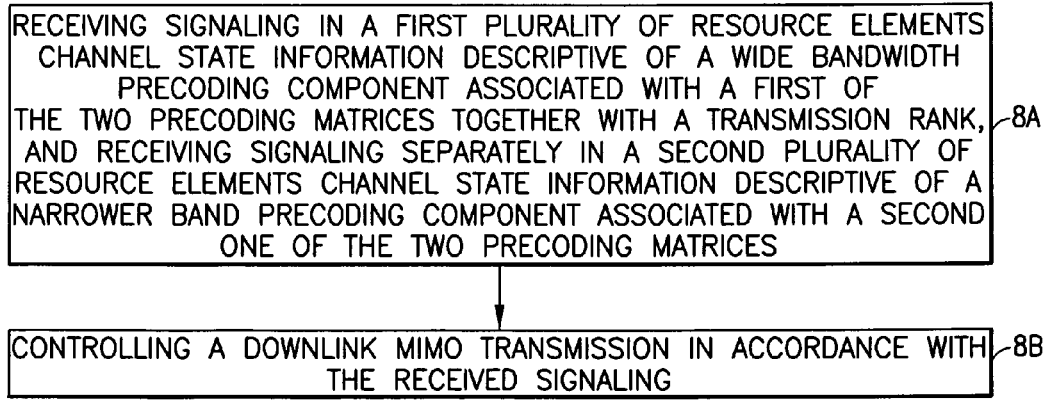

FIG. 8 is a logic flow diagram that illustrates the operation of a method, and a result of execution of computer program instructions, further in accordance with the exemplary embodiments of this invention. In accordance with these exemplary embodiments a method performs, at Block 8A, a step of receiving signaling in a first plurality of resource elements channel state information descriptive of a wide bandwidth precoding component associated with a first of the two precoding matrices together with a transmission rank, and receiving signaling separately in a second plurality of resource elements channel state information descriptive of a narrower band precoding component associated with a second one of the two precoding matrices. At Step 8B there is a step of controlling a downlink MIMO transmission in accordance with the received signaling.

The method of the preceding paragraph, where the signaling is received from one of the physical uplink control channel or the physical uplink shared channel.

Figure 9:
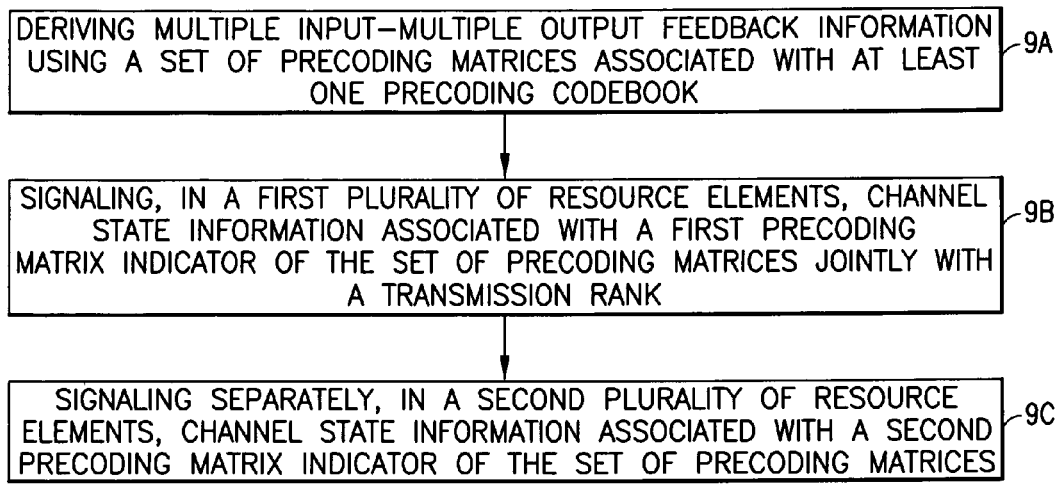

FIG. 9 is a logic flow diagram that illustrates the operation of a method, and a result of execution of computer program instructions, in accordance with the exemplary embodiments of this invention. In accordance with these exemplary embodiments a method performs, at Block 9A, a step of deriving multiple input-multiple output feedback information using a set of precoding matrices associated with at least one precoding codebook. At Block 9B there is a step of signaling, in a first plurality of resource elements, channel state information associated with a first precoding matrix indicator of the set of precoding matrices jointly with a transmission rank.

At Block 9C there is a step of signaling separately, in a second plurality of resource elements, channel state information associated with a second precoding matrix indicator of the set of precoding matrices.

In the method of the preceding paragraph, where the first precoding matrix indicator and the second precoding matrix indicator of the set of precoding matrices pertain to wideband communication channel properties.

In the method of the preceding paragraphs, where the transmission rank is signaled implicitly with the first precoding matrix indicator.

In the method as illustrated in FIG. 9, where the channel state information associated with the first precoding matrix indicator is signaled in a first subframe of a frame, and where the channel state information associated with the second precoding matrix indicator is signaled in at least one subsequent subframe of the frame following the first subframe of the frame.

In the method as illustrated in FIG. 9, where the signaling is performed using a physical uplink control channel.

In the method as illustrated in FIG. 9, where the signaling is performed one of periodically or aperiodically using at least one of a physical uplink control channel and a physical uplink shared channel.

In the method as illustrated in FIG. 9, where the signaling is performed one of periodically or aperiodically using a physical uplink shared channel, and where the signaling the channel state information associated with the first precoding matrix indicator and the transmission rank is performed using at least one set of resource elements of a block of single carrier-frequency division multiple access symbols, where the at least one set of resource elements follow a set of resource elements used to signal the channel state information associated with the second precoding matrix indicator.

In the method as illustrated in FIG. 9, where the signaling is performed one of periodically or aperiodically using a physical uplink shared channel, and where the signaling the channel state information associated with a first precoding matrix indicator and the transmission rank is performed using at least one set of resource elements of a block of single carrier-frequency division multiple access symbols, where the at least one set of resource elements are signaled before a set of resource elements used to signal the channel state information associated with the second precoding matrix indicator.

In the method of the preceding paragraphs, where the signaling the channel state information associated with a first precoding matrix indicator and the transmission rank is forward error corrected using one of (32, N) walsh-hadamard block coding or (20, N) walsh-hadamard block coding.

Figure 10:
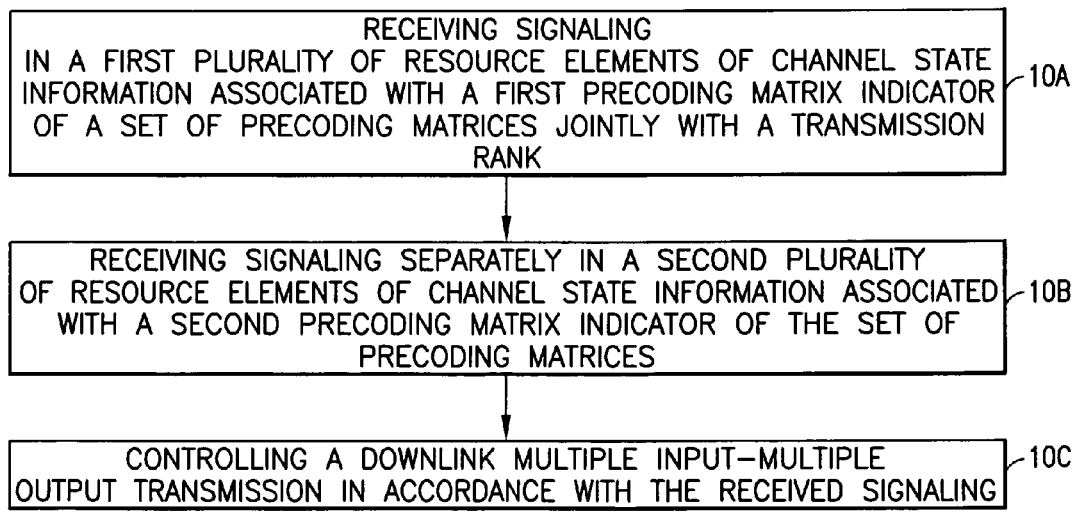

FIG. 10 is a logic flow diagram that illustrates the operation of a method, and a result of execution of computer program instructions, in accordance with the exemplary embodiments of this invention. In accordance with these exemplary embodiments a method performs, at Block 10A, a step of receiving signaling in a first plurality of resource elements of channel state information associated with a first precoding matrix indicator of a set of precoding matrices jointly with a transmission rank. At Block 10B there is a step of receiving signaling separately in a second plurality of resource elements of channel state information associated with a second precoding matrix indicator of the set of precoding matrices. At Block 10C there is a step of controlling a downlink multiple input-multiple output transmission in accordance with the received signaling.

The method as illustrated in FIG. 10, where the first precoding matrix indicator and the second precoding matrix indicator of the set of precoding matrices pertain to wideband communication channel properties.

In the method as illustrated in FIG. 10, where the transmission rank is implicitly determined based on the received signaling.

In the method as illustrated in FIG. 10, wherein the signaling is received via a physical uplink control channel.

In the method as illustrated in FIG. 10, where the signaling is received one of periodically or aperiodically via at least one of a physical uplink control channel and a physical uplink shared channel.

The various blocks shown in FIGS. 7, 8, 9, and 10 may be viewed as method steps, and/or as operations that result from operation of computer program code stored in a non-transitory computer-readable memory medium, and/or as a plurality of coupled logic circuit elements constructed to carry out the associated function(s).

The exemplary embodiments also pertain to an apparatus, comprising a processor and a memory including computer program code. Where the memory and computer program code are configured to, with the processor, cause the apparatus at least to perform deriving multiple input-multiple output feedback information using a set of precoding matrices associated with at least one precoding codebook, signaling, in a first plurality of resource elements, channel state information associated with a first precoding matrix indicator of the set of precoding matrices jointly with a transmission rank, and signaling separately, in a second plurality of resource elements, channel state information associated with a second precoding matrix indicator of the set of precoding matrices.

The exemplary embodiments also pertain to an apparatus, comprising a processor and a memory including computer program code. Where the memory and computer program code are configured to, with the processor, cause the apparatus at least to perform receiving signaling in a first plurality of resource elements of channel state information associated with a first precoding matrix indicator of a set of precoding matrices jointly with a transmission rank, receiving signaling separately in a second plurality of resource elements of channel state information associated with a second precoding matrix indicator of the set of precoding matrices, and controlling a downlink multiple input-multiple output transmission in accordance with the received signaling.

The exemplary embodiments also pertain to an apparatus, comprising a processor and a memory including computer program code. Where the memory and computer program code are configured to, with the processor, cause the apparatus at least to perform deriving multiple input-multiple output feedback information using two precoding matrices associated respectively with two precoding codebooks, and transmitting signaling, in a first plurality of resource elements, of channel state information descriptive of a wide bandwidth precoding component associated with a first of the two precoding matrices jointly with a transmission rank, and signaling separately, in a second plurality of resource elements, channel state information descriptive of a narrower band precoding component associated with a second one of the two precoding matrices.

The exemplary embodiments also pertain to an apparatus, comprising a processor and a memory including computer program code. Where the memory and computer program code are configured to, with the processor, cause the apparatus at least to perform receiving signaling in a first plurality of resource elements channel state information descriptive of a wide bandwidth precoding component associated with a first of the two precoding matrices jointly with a transmission rank, and receiving signaling separately in a second plurality of resource elements channel state information descriptive of a narrower band precoding component associated with a second one of the two precoding matrices. The apparatus is further configured to control a downlink MIMO transmission in accordance with the received signaling.

The exemplary embodiments of the invention pertain to an apparatus, comprising: means for deriving multiple input-multiple output feedback information using a set of precoding matrices associated with at least one precoding codebook, means for signaling, in a first plurality of resource elements, channel state information associated with a first precoding matrix indicator of the set of precoding matrices jointly with a transmission rank, and means for signaling separately, in a second plurality of resource elements, channel state information associated with a second precoding matrix indicator of the set of precoding matrices.

The apparatus according to the preceding paragraph, where the means for deriving and the means for signaling comprise at least one memory including computer program code executed by at least one processor.

The exemplary embodiments of the invention pertain to an apparatus, comprising: means for receiving signaling in a first plurality of resource elements of channel state information associated with a first precoding matrix indicator of a set of precoding matrices jointly with a transmission rank; means for receiving signaling separately in a second plurality of resource elements of channel state information associated with a second precoding matrix indicator of the set of precoding matrices; and means for controlling a downlink multiple input-multiple output transmission in accordance with the received signaling.

The apparatus according to the preceding paragraph, where the means for receiving signaling and the means for controlling comprise at least one memory including computer program code executed by at least one processor.

It is noted that, as in the application, the words first and second are non-limiting. The words first and second are each operative, such as, to indicate that the first precoding matrix indicator is before the second precoding matrix indicator, and that the first subframe of the frame is before the at least one subsequent subframe of the frame. The words first and second, or other numbering words of the application, are not representative of a specific position, such as in a frame or of indicators such as in a set of indicators.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the UTRAN LTE and LTE-A systems, it should be appreciated that the exemplary embodiments of this invention are not limited for use with only these particular types of wireless communication systems, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g. PMI1, PMI2, etc.) are not intended to be limiting in any respect, as these parameters may be identified by any suitable names. Further, the various names assigned to different channels (e.g. PUCCH, PUSCH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
deriving multiple input-multiple output feedback information using a set of precoding matrices associated with at least one precoding codebook;
signaling, in a first plurality of resource elements, channel state information associated with a first precoding matrix indicator of the set of precoding matrices jointly with a transmission rank; and
signaling separately, in a second plurality of resource elements, channel state information associated with a second precoding matrix indicator of the set of precoding matrices.

2. The method according to claim 1, where the first precoding matrix indicator and the second precoding matrix indicator of the set of precoding matrices pertain to wideband communication channel properties.

3. The method according to claim 1, where the transmission rank is signaled implicitly with the first precoding matrix indicator.

4. The method according to claim 1, where the channel state information associated with the first precoding matrix indicator is signaled in a first subframe of a frame, and where the channel state information associated with the second precoding matrix indicator is signaled in at least one subsequent subframe of the frame following the first subframe of the frame.

5. The method according to claim 1, where the signaling is performed using a physical uplink control channel.

6. The method according to claim 1, where the signaling is performed one of periodically or aperiodically using a physical uplink shared channel, and where the signaling the channel state information associated with the first precoding matrix indicator and the transmission rank is performed using at least one set of resource elements of a block of single carrier-frequency division multiple access symbols, where the at least one set of resource elements is one of following a set of resource elements or is before a set of resource elements used to signal the channel state information associated with the second precoding matrix indicator.

7. A non-transitory computer readable memory embodying computer program instructions executable by at least one processor to perform the method according to claim 1.

8. An apparatus, comprising:
at least one processor; and
at least one memory including computer program code, where the at least one memory and the computer program code are configured, with the at least one processor, to cause the apparatus to at least:
derive multiple input-multiple output feedback information using a set of precoding matrices associated with at least one precoding codebook;
signal, in a first plurality of resource elements, channel state information associated with a first precoding matrix indicator of the set of precoding matrices jointly with a transmission rank; and
signal separately, in a second plurality of resource elements, channel state information associated with a second precoding matrix indicator of the set of precoding matrices.

9. The apparatus according to claim 8, where the first precoding matrix indicator and the second precoding matrix indicator of the set of precoding matrices pertain to wideband communication channel properties.

10. The apparatus according to claim 8, where the transmission rank is signaled implicitly with the first precoding matrix indicator.

11. The apparatus according to claim 8, where the at least one memory including the computer program code is configured, with the at least one processor, to cause the apparatus to signal the channel state information associated with the first precoding matrix indicator in a first subframe of a frame, and signal the channel state information associated with the second precoding matrix indicator in at least one subsequent subframe of the frame following the first subframe of the frame.

12. The apparatus according to claim 8, where the at least one memory including the computer program code is configured, with the at least one processor, to cause the apparatus to perform the signaling using a physical uplink control channel.

13. The apparatus according to claim 8, where the at least one memory including the computer program code is configured, with the at least one processor, to cause the apparatus to perform the signaling one of periodically or aperiodically using a physical uplink shared channel, and to perform the signaling of the channel state information associated with the first precoding matrix indicator and the transmission rank using at least one set of resource elements of a block of single carrier-frequency division multiple access symbols, where the at least one set of resource elements is one of following a set of resource elements or is before a set of resource elements used to signal the channel state information associated with the second precoding matrix indicator.

14. A method, comprising:
receiving signaling in a first plurality of resource elements of channel state information associated with a first precoding matrix indicator of a set of precoding matrices jointly with a transmission rank;
receiving signaling separately in a second plurality of resource elements of channel state information associated with a second precoding matrix indicator of the set of precoding matrices; and
controlling a downlink multiple input-multiple output transmission in accordance with the received signaling.

15. The method according to claim 14, where the first precoding matrix indicator and the second precoding matrix indicator of the set of precoding matrices pertain to wideband communication channel properties.

16. The method according to claim 14, where the transmission rank is implicitly determined based on the received signaling.

17. The method according to claim 14, where the signaling is received via a physical uplink control channel.

18. A non-transitory computer readable memory embodying computer program instructions executable by at least one processor to perform the method according to claim 14.

19. An apparatus, comprising:
at least one processor; and
at least one memory including computer program code, where the at least one memory and the computer program code are configured, with the at least one processor, to cause the apparatus to at least:
receive signaling in a first plurality of resource elements of channel state information descriptive associated with a first precoding matrix indicator of a set of precoding matrices jointly with a transmission rank;
receive signaling separately in a second plurality of resource elements of channel state information associated with a second precoding matrix indicator of the set of precoding matrices; and
control a downlink multiple input-multiple output transmission in accordance with the received signaling.

20. The apparatus according to claim 19, where the first precoding matrix indicator and the second precoding matrix indicator of the set of precoding matrices pertain to wideband communication channel properties.

21. The apparatus according to claim 19, where the signaling is received via a physical uplink control channel.

22. The apparatus according to claim 19, comprising the at least one memory including the computer program code is configured, with the at least one processor, to cause the apparatus to determine the transmission rank based on the received signaling.

* * * * *